United States Patent
Alouini et al.

(10) Patent No.: US 10,476,750 B2
(45) Date of Patent: Nov. 12, 2019

(54) ROBUST NODE ESTIMATION AND TOPOLOGY DISCOVERY FOR LARGE-SCALE NETWORKS

(71) Applicant: KING ABDULLAH UNIVERSITY OF SCIENCE AND TECHNOLOGY, Thuwal (SA)

(72) Inventors: Mohamed-Slim Alouini, Thuwal (SA); Ahmed Douik, Pasadena, CA (US); Salah A. Aly Ahmed, Thuwal (SA); Tareq Y. Al-Naffouri, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 31 days.

(21) Appl. No.: 15/747,554

(22) PCT Filed: Aug. 18, 2016

(86) PCT No.: PCT/IB2016/054949
§ 371 (c)(1),
(2) Date: Jan. 25, 2018

(87) PCT Pub. No.: WO2017/029635
PCT Pub. Date: Feb. 23, 2017

(65) Prior Publication Data
US 2018/0227188 A1 Aug. 9, 2018

Related U.S. Application Data

(60) Provisional application No. 62/207,128, filed on Aug. 19, 2015.

(51) Int. Cl.
*H04W 84/18* (2009.01)
*H04L 12/24* (2006.01)

(52) U.S. Cl.
CPC ............. *H04L 41/12* (2013.01); *H04W 84/18* (2013.01)

(58) Field of Classification Search
CPC ....... H04W 84/18; H04W 4/027; H04W 4/22; H04L 41/12
See application file for complete search history.

(56) References Cited

U.S. PATENT DOCUMENTS 7,522,908 B2 * 4/2009 Hrastar ................. H04W 24/00
370/242
2009/0265141 A1 10/2009 Aly et al.
(Continued)

FOREIGN PATENT DOCUMENTS

EP 2169994 3/2010

OTHER PUBLICATIONS

Aly, S. A., et al.; "Distributed Data Collection and Storage Systems for Collaborative Learning Vision Sensor Devices with Applications to Pilgrimage"; International Journal of Sensor Networks, vol. 12, No. 3; Oct. 2012; pp. 137-148.
(Continued)

*Primary Examiner* — Wei Zhao
(74) *Attorney, Agent, or Firm* — Patent Portfolio Builders PLLC

(57) ABSTRACT

Various examples are provided for node estimation and topology discovery for networks. In one example, a method includes receiving a packet having an identifier from a first node; adding the identifier to another transmission packet based on a comparison between the first identifier and existing identifiers associated with the other packet; adjusting a transmit probability based on the comparison; and transmitting the other packet based on a comparison between the transmit probability and a probability distribution. In another example, a system includes a network device
(Continued)

that can adds an identifier received in a packet to a list including existing identifiers and adjust a transmit probability based on a comparison between the identifiers; and transmit another packet based on a comparison between the transmit probability and a probability distribution. In another example, a method includes determining a quantity of sensor devices based on a plurality of identifiers received in a packet.

18 Claims, 8 Drawing Sheets

(56) References Cited

U.S. PATENT DOCUMENTS

| 2010/0291879 | A1* | 11/2010 | Konishi | G01S 5/0252 455/67.11 |
|---|---|---|---|---|
| 2014/0242991 | A1 | 8/2014 | Yanover et al. | |
| 2014/0247821 | A1 | 9/2014 | Yamada et al. | |
| 2015/0063350 | A1 | 3/2015 | Sundaram et al. | |
| 2017/0055130 | A1* | 2/2017 | LeBlanc | G01C 21/206 |

OTHER PUBLICATIONS

Aly, S. A., et al.; "Distributed Flooding-based Storage Algorithms for Large-Scale Wireless Sensor Networks"; Proc. of IEEE International Conference on Communications (ICC 2009), Jun. 14-18, 2009; pp. 1-5; Dresen, Germany.

Aly, S. A., et al.; "Fountain Codes Based Distributed Storage Algorithms for Large-scale Wireless Sensor Networks"; Proc. of the 13th International Symposium on Information Processing in Sensor Networks (IPSN' 2014); Apr. 2008; pp. 171-182; St. Louis, MO.

Cattani, M., et al.; "Lightweight Neighborhood Cardinality Estimation in Dynamic Wireless Networks"; Proc. of the 13th International Symposium on Information Processing in Sensor Networks (IPSN' 2014), 2014; Apr. 15-17, 2014; pp. 179-189; Berlin, Germany.

Cidon, I., et al.; "Message Terminate Algorithms for Anonymous Rings of Unknown Size"; Information Processing Letters, 54(2):111-119, Apr. 1995; pp. 112-119.

Douik, A., et al.; "Robust Node Estimation and Topology Discovery Algorithm in Large-Scale Wireless Sensor Networks"; [dowlnloaded at https://arxiv.org/abs/1508.04921]; Aug. 20, 2015; pp. 1-8.

Hendrickx, J. M., et al.; "Distributed Anonymous Discrete Function Computation"; IEEE Transactions on Automatic Control, vol. 56, No. 10; Oct. 2011; pp. 2276-2289.

Katzir, L., et al.; "Estimating Sizes of Social Networks via Biased Sampling"; Internet Mathematics, vol. 10, No. 3-4; Mar. 28-Apr. 1, 2011; pp. 597-605.

M. Yamashita, et al.; "Computing on Anonymous Networks: Part 1—Characterizing the Solvable Cases"; IEEE Transactions on Parallel and Distributed Systems, vol. 7, No. 1, Jan. 1996; pp. 69-89.

Ruggles, R., et al.; "An empirical approach to economic intelligence in World War II"; J. Amer. Stat. Assoc., vol. 42, No. 237, Mach 1947; pp. 72-91.

Shafaat, T. M., et al., "A Practical Approach to Network Size Estimation for Structured Overlays"; In: Hummel K.A., Sterbenz J.P.G. (eds) Self-Organizing Systems, Lecture Notes in Computer Science, vol. 5343. Springer, Third International Workshop, IWSOS 2008; Dec. 10-12, 2008; Vienna, Austria.

Shames, I., et al.; "Distributed Network Size Estimation and Average Degree Estimation and Control in Networks Isomorphic to Directed Graphs"; Fiftieth Annual Allerton Conference on Communication, Control and Computing (Allerton' 2012), Oct. 1-5, 2012; pp. 1885-1892; Monticello, IL.

Szymanski, B., et al.; "The Complexity of Node Counting on Undirected Graphs"; Technical report, Computer Science Department, Rensselaer Technical Institute, Troy, NY; 1998; pp. 1-13.

Varagnolo, D., et al.; "Distributed Cardinality Estimation in Anonymous Networks"; IEEE Trans Automatic Control, vol. 59, No. 3; Mar. 2014; pp. 645-659.

Wang, P., et al.; "Sampling Content Distributed Over Graphs"; CoRR, vol. abs/1311.3882; Nov. 13, 2013; pp. 1-14.

International Search Report in related International Application No. PCT/IB2016/054949, dated Nov. 3, 2016.

NPL_Hahn, S., et al., "Mobility Load Balancing—A Case Study: Simplified vs. Realistic Scenarios," Technische Universitat Braunschweig, Institute for Communications Technology, Braunschweig, Germany, May 26-28, 2014.

Written Opinion of the International Searching Authority in related International Application No. PCT/IB2016/054949, dated Nov. 3, 2016.

* cited by examiner

Algorithm 1 Initialization Phase.

Require: $\mathcal{G} = (\mathcal{V}, \mathcal{E})$, with $\mathcal{V} = \{s_1, \ldots, s_n\}$ and $f_{s_i}^{initial}$, $\forall s_i$.
  Initialize $\mathcal{T}(0) = \varnothing$.
  for all $s_i \in \mathcal{V}$ do
    Initialize $P_{s_i} = \{ID_i\}$
    Initialize $f_{s_i} = f_{s_i}^{initial}$
  end for

Algorithm 2 Knowledge dissemination Phase.

Require: $\mathcal{G} = (\mathcal{V}, \mathcal{E})$, with $\mathcal{V} = \{s_1, \ldots, s_n\}$.
  for $t = 1, 2, \cdots$ do
    Set $\mathcal{T}(t) = \varnothing$.
    for all $s_i \in \mathcal{V}$ do
      for all $s_j \in \mathcal{T}(t-1)$ do
        if $P_{s_j}$ heard then
          Set $S_i = S_i \cup s_j$.
          if $P_{s_j} \not\subseteq P_{s_i}$ then
            Set $P_{s_i} = (P_{s_i} \cup P_{s_j}) \setminus ID_i$.
            Set $P_{s_i} = \{P_{s_i}, ID_i\}$.
            Set $f_{s_i} = \frac{1}{2}(f_{s_i} + 1)$.
          end if
        end if
      end for
      Sample $u_{s_i}$ from $\mathcal{U}(0,1)$.
      if $u_{s_i} < f_{s_i}$ then
        $s_i$ broadcasts $P_{s_i}$.
        Set $f_{s_i} = f_{s_i}^{initial}$.
        Set $\mathcal{T}(t) = \mathcal{T}(t) \cup s_i$.
      end if
    end for
  end for

FIG. 4

Algorithm 3 Data queries and network size estimation.

Require: $\mathcal{G} = (\mathcal{V}, \mathcal{E})$ and $\mathcal{K}$ with $|\mathcal{K}| = k \ll n$.
  Initialize $\hat{P} = \varnothing$.
  for all $s_i \in \mathcal{K}$ do
    $\hat{P} = \hat{P} \cup P_{s_i}$.
  end for
  Set $\hat{\tilde{n}} = |\hat{P}|$

ROBUST NODE ESTIMATION AND TOPOLOGY DISCOVERY FOR LARGE-SCALE NETWORKS

CROSS REFERENCE TO RELATED APPLICATIONS

This application is a U.S. National Stage Application of International Application No. PCT/IB2016/054949, filed on Aug. 18, 2016, which claims priority to, and the benefit of, U.S. provisional application entitled "Robust Node Estimation and Topology Discovery for Large-Scale Networks" having Ser. No. 62/207,128, filed Aug. 19, 2015, which are hereby incorporated by reference in its their entirety.

BACKGROUND

Wireless Sensor Networks (WSNs) have been a great success in the past decades. Generally, a WSN refers to a set of small electronic devices (sensors) capable of monitoring and measuring certain phenomena, e.g., temperature, pressure, flood, fires, etc., usually in hazardous and non-reachable environments. A WSN is typically composed of hundreds to millions of nodes capable of intersecting and communicating with each other. Due to their small size, these devices have limited resources such as memory, computation power, battery lifetime and bandwidth.

SUMMARY

Embodiments of the present disclosure are related to robust node estimation and topology discovery for networks, including large scale networks.

In one embodiment, among others, a method comprises receiving, over a wireless channel, a first transmission packet that includes a first identifier from a first one of a plurality of nodes; adding the first identifier to a second transmission packet based at least in part on a first comparison between the first identifier and a plurality of existing identifiers associated with the second transmission packet; adjusting a transmit probability based on the first comparison; and transmitting, over the wireless channel, the second transmission packet to at least one of the plurality of nodes based at least in part on a second comparison between the transmit probability and a probability distribution. In one or more aspects of these embodiments, the method can comprise determining a probability distribution associated with the plurality of nodes with respect to the first one of the plurality of nodes. At least one of the plurality of nodes can comprise a sensor device. The sensor device can be configured to measure at least one of: a temperature, a pressure, a voltage, or a current.

In another embodiment, a system comprises a first network device in a network; and an application executable in the first network device. Execution of the application causes the first network device to at least generate a first transmission packet that includes a first identifier and a list comprising a plurality of existing identifiers; receive a second transmission packet that includes a second identifier from a second network device in the network; add the second identifier to the list in response to a first comparison between the second identifier and the plurality of existing identifiers; adjust a transmit probability based on the first comparison; and transmit the first transmission packet to a third network device in the network based at least in part on a second comparison between the transmit probability and a probability distribution. In one or more aspects of these embodiments, the first comparison can determine whether the second identifier matches one of the plurality of existing identifiers. The transmit probability can be increased when the second identifier does not match one of the plurality of existing identifiers.

In one or more aspects of these embodiments, the first network device can transmit the first transmission packet to a data collector in response to a query message from the data collector. The transmit probability can indicate a probability that the first network device will transmit the first transmission packet. The first network device can determine the probability distribution by calculating a uniform distribution. The first network device can transmit the first transmission packet to the third network device when the transmit probability exceeds the probability distribution. The first network device can reset the transmit probability to an initial probability in response to transmission of the first transmission packet to the third network device. The first network device can comprise a wireless transceiver, and the first transmission packet is transmitted over a wireless channel using the wireless transceiver. The list can comprise the plurality of existing identifiers represents a plurality of neighboring wireless network devices located within a predefined radius with respect to a location of the first network device.

In another embodiment, a method comprises transmitting, using a computing device, a query message to a plurality of sensor devices, the query message being transmitted over a wireless channel; receiving a transmission packet from at least one of the plurality of sensor devices, the transmission packet comprising data indicating a plurality of identifiers; and determining, using the computing device, a quantity of the plurality of sensor devices based at least in part on the plurality of identifiers.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 4 is an example algorithm illustrating a dissemination of knowledge among multiple sensor nodes, according to various embodiments of the present disclosure.

FIG. 5 is an example algorithm illustrating a query phase associated with a data collector, according to various embodiments of the present disclosure.

DETAIL DESCRIPTION

Figure 1:
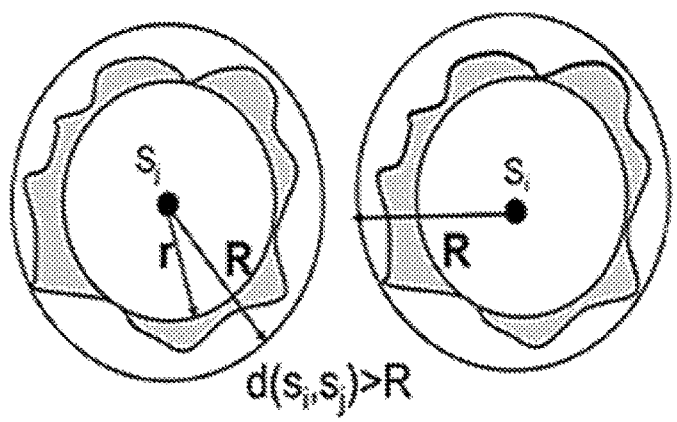
FIG. 1 is an example drawing illustrating the transmission range of two sensor devices, according to various embodiments of the present disclosure.

Disclosed herein are various embodiments of node estimation and/or topology discovery for large-scale networks where nodes communicate with each other such as, e.g., a wireless sensor network (WSN). In particular, the present disclosure relates to a novel approach for estimating cardinality, i.e., the number of nodes, in large scale anonymous graphs using statistical inference methods. In anonymous graphs, each node possesses little or non-existing information on the network topology. References will now be made in detail to the description of the embodiments as illustrated in the drawings.

The present disclosure relates to determining network characteristics such as the number of nodes distributed randomly and uniformly in a given field. There are several benefits for cardinality estimation in graphs such as energy efficiency, mobile communication and coding schemes design, data collections, and distributed storage. Furthermore, various embodiments of the present disclosure can enable each node to discover its neighbors, which help network designers enhance coverage and connectivity.

Applications of the network size estimation are not limited to WSN. With the shift in the design from the centralized architectures to decentralized ones, the problem becomes increasingly in demand due to its applications in social networks, online users, active protein cells, and artificial intelligence. Even though decentralized systems are more scalable and robust to failure, their use makes the estimation of the parameters of the whole network challenging.

With respect to the problem of node counting in an undirected graph, the aim is to visit all nodes of a graph and avoid revisiting nodes. The problem has numerous applications in artificial intelligence and control theory. However, the problem has proven to be NP-complete with a time complexity given by $\Omega(n^{\sqrt{n}})$ where n is the cardinality of the graph. NP refers to "nondeterministic polynomial time". Therefore, such an approach is unsuited for large-scale networks.

The use of statistical inference for cardinality estimation of a given network first appeared in the literature with the German tank problem, in which the aim was to estimate the total number of tanks given the serial number of the captured ones. The various embodiments of the present disclosure relate to sampling a subset of the entire population and available information. For example, some embodiments can query a small portion of nodes to infer information about the whole network status.

The difficulty of the network size estimation can heavily depend on the assumptions and features of the system. The present disclosure considers the anonymous networks framework approach, where nodes only know their unique identifier (ID). In anonymous networks, each node possesses little or non-existing information on the network topology. It has been shown that with a centralized strategy, the node estimation can be obtained in finite time with probability one. For a large network, the complexity of discovering with probability one (1) is very high. For non-unique IDs, it has also been demonstrated that the estimation cannot be performed with probability one in limited time or with a bounded computational complexity. The problem is, then, to discover estimators that trade-off small error likelihood and moderate computational complexity.

Various embodiments of the present disclosure relate to a hybrid scheme that not only performs node counting that can be run for an arbitrary time period, but further uses the output to carry out the network size estimation. Such an estimate can benefit network designers to design the coding schemes appropriately. Various embodiments of the present disclosure combine the advantages of both the node counting algorithms and the node estimation ones. Given that the time and computation complexity of node counting algorithms is high, their use in large-scale networks is prohibitive. On the other hand, network size estimation algorithms have, in general, high variance. Depending on the initialization parameters, the estimate of the proposed scheme balances these two effects and can be made as arbitrarily close to the network cardinality as wanted. Furthermore, various embodiments can, at the same time, discover the neighbors of each node. Such knowledge can be useful for data routing, which can be combined with the code design resulting in efficient resource utilization. In this context, an estimate may be provided based on nodes with unique IDs. In other embodiments, an estimate can be provided where the nodes may not have a unique ID by exploiting the inverse birthday paradox.

Network Model and Problem Formulation

A. Network Model

Consider a wireless sensor network $\mathcal{N}$ with n sensor nodes that are randomly and uniformly distributed in a region $A=[0,L]\times[0, W]$ for some L, W>0. The network $\mathcal{N}$ can be considered as an abstract graph $\mathcal{G}=(\mathcal{V},\varepsilon)$ with a set of node $\mathcal{V}$ and a set of edges $\varepsilon$, where $n=|\mathcal{V}|$. The set $\mathcal{V}=\{s_1, \ldots, s_n\}$ can represent the sensors that measure information about a specific field, and $\varepsilon$ represents the set of links between the sensors.

As shown in FIG. 1, two arbitrary sensors $s_i$ and $s_j$ for $1\leq i\neq j\leq n$ can be connected if they are in the transmission range each other. Therefore, $s_i$ and $s_j$ are connected if and only if $d(s_i,s_j)\leq R$, where $d(\cdot,\cdot)$ is the distance operator. Assuming that the transmission range is circular, let R be its radius. The various embodiments of the present disclosure are independent of the considered transmission range. However, the performance analysis provided in the rest of this disclosure assumes a circular transmission range with the same radius for all nodes.

Assume that neither the number of these n nodes, i.e., the network size, nor their connections, i.e., the network topology, are known. However, a bound on the network size $N_{max} \geq n$ is known by the data fusion center. This scenario can be seen as a network after a long running time or a disaster. Initially, the network is composed of $N_{max}$ nodes each having a unique ID. After a long running time or a disaster, some of the nodes may disappear from the graph leaving a graph with $n \leq N_{max}$ nodes with unique ID. Let $ID_i$ be the ID of sensor $s_i$.

B. Network Protocol

In the considered network model, each node may know only its unique identifier. Communication between nodes can be performed by broadcasting the information to the other nodes. Note that nodes need not transmit additional bits indicating its ID with the information packet. Moreover, no acknowledgement is expected from sensors that successfully receive a packet. Transmissions are subject to erasure at the sensors with a probability of $q_{s_i}$, for sensor $s_i$. In other words, for a sensor $s_i$ broadcasting data, sensors $s_j \in S_i$ successfully receives the data with probability $1-q_{s_j}$ where $S_i$ is the set of neighbors of the node $s_i$ defined as follows.

Definition 1. Denote by $S_i$ the set of neighbors of a node $s_j$, $1 \leq i \leq n$. In other words, $S_i = \{s_j \in \mathcal{V}, \text{ such that } d(s_i, s_j) \leq R\}$.

The present disclosure can consider static nodes in the network. Therefore, due to the static nature of the nodes, their relative position in the network remains identical which results in an unchanged set of neighbors for all nodes.

C. Problem Formulation

Given the aforementioned network model and protocol, the present disclosure's objectives include:
1) Estimating the number of nodes n by randomly asking K nodes in the network. Let K be the set of nodes in the network that can be queried by the data collector. This set of nodes can be randomly picked from the set of alive and dead nodes with $|K|=K \ll |\mathcal{V}|=n \leq N_{max}$.
2) Discovering locally, for an arbitrary node $s_i$, its set of neighbors $S_i$.

Without a loss of generality, the data collector (DC) can be assumed to know the IDs of the nodes in the initial network comprising $N_{max}$ sensors. The selection of the queried nodes can be performed by sampling uniformly without replacement from this set of IDs. Such methods can result in K nodes randomly picked from the set of alive and dead ones. Throughout the present disclosure, the notation $U(0,1)$ refers to the uniform distribution over $(0,1)$.

Node Estimation Algorithm

This section introduces the hybrid node counting and estimation algorithm. The algorithm can estimate the total number of nodes in a network. The algorithm can run in three distinct phases: the initialization, the knowledge distribution, and the query phases. In the initialization phase, the initial packets of the nodes and their transmit probability can be set. In the knowledge distribution phase, the information about the networks can be disseminated among the surviving nodes from neighbor to neighbors. Finally, in the query stage, the DC can collect the information about the network by asking some nodes and inferring the size of the whole system.

A. Initialization Phase

In the initial step, each node in the network can generate a packet containing its ID. As the packet size limitation can have an effect on the results, the various embodiments of the present disclosure can consider reducing it. For a network with initial $N_{max}$ nodes, the distinct IDs can be encoded using $\lceil \log_2(N_{max}) \rceil$, where $\lceil \cdot \rceil$ is the ceiling function. Therefore, the maximum size a packet can reach at any node in the network is $n \lceil \log_2(N_{max}) \rceil$ as only n nodes are alive. Such packet size is convenient for practical scenarios as it scales logarithmically with $N_{max}$ and linearly with n.

Figures 2, 3:
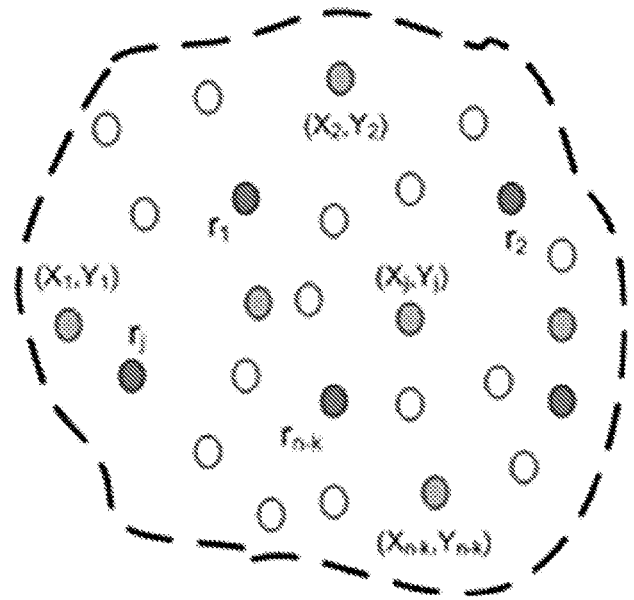
FIG. 2 is an example algorithm illustrating an initialization phase of a sensor node, according to various embodiments of the present disclosure.
FIG. 3 is an example drawing illustrating a network of nodes and a corresponding set of coordinates for each node, according to various embodiments of the present disclosure.

Each node $s_i$ also can initialize its initial transmit probability $f_{s_i}^{initial}$, where $f_{s_i}^{initial}$ is the probability that the node broadcasts the packet it already holds to its neighbors. Whereas a small value of the initial probability means that there is a small amount of communication between nodes in the network, a value $f_{s_i}^{initial} \approx 1$ means that all nodes broadcast their packets at each iteration. Let $\mathcal{T}(t)$ be the set of nodes that transmitted a packet at time instant t with $\mathcal{T}(0)=\emptyset$. FIG. 2 summarizes the steps of the initialization phase as one non-limiting example.

In alternative embodiments, the present disclosure can be extended to perform topology discovery with the estimation of both $\mathcal{V}$ and $\varepsilon$, by modifying the initial packets of each node. As shown in FIG. 3, each node $s_i$ can generate a packet containing both its ID and its (X, Y) coordinates. Assuming that coordinates are encoded using V bits, the maximum size a packet can reach is $2Vn \lceil \log_2(N_{max}) \rceil$. Therefore, the size of the topology discovery packet scales in the same manner as the one of the cardinality estimation.

B. Knowledge Distribution Phase

In this phase, knowledge can be distributed among the alive nodes in the network from neighbor to neighbor. At each iteration of the algorithm, if a node $s_i$ receives a packet from a node $s_j$ whose ID can be determined by examining the last ID in the received packet, it can add such node to its set of neighbors $S_i$. Depending on the content of the received packet, two scenarios can be distinguished:
1) The packet does not contain new information for $s_i$, i.e. $P_{s_j} \subseteq P_{s_i}$: The packet can be discarded and the buffer may not be updated.
2) The packet brings new information to the node, i.e., $P_{s_j} \not\subseteq P_{s_i}$: The node can update its buffer and can increase its transmit probability. The more informative packets a node receives, the more its transmit probability can increase. This is motivated by the fact that the more new information a node receives, it can become a better candidate to transmit its information. To be able to estimate locally the neighbors of the nodes, each node can first remove its ID from the packet it possesses and then append it to the end of the packet.

Afterward, each node $s_i$ can sample from a probability distribution $U(0,1)$ and can decide, according to $f_{s_i}$, either to broadcast $P_{s_i}$ or not. After broadcasting data, the node can reset its transmit probability to the initial value. This is motivated by the fact that after transmission, if all neighbors received the packet, then node $s_i$ may not bring new information anymore unless it receives new packets. FIG. 4 summarizes the steps of the knowledge distribution phase as one non-limiting example.

C. Query Phase

In this phase, a DC can query some nodes from the set of nodes to retrieve information about the current status of the network N and infer its size $P_{s_i}$. If the queried node $s_i$ is alive then it can transmit its packet $P_{s_i}$. Otherwise, there may be no transmission, and the packet of that node can be the empty set.

After querying the nodes, their packets can be processed using the union operator and by counting the number of IDs. In other words, the quantity $\tilde{Z}$, the counting estimation, can be obtained by $\tilde{Z}=|\tilde{P}|$ where $|\cdot|_1$ is the cardinality operator. The next section relates the counting estimation to the Best Linear Unbiased Estimators (BLUE) of network size ñ. FIG. 5 summarizes the steps of the query phase as one non-limiting example.

Performance Analysis

Let $X_{ij}(t)$ be a Bernoulli random variable denoting if node $s_i$ knows that node $s_j$ is alive. Let $X_i(t)=(X_{i1}(t), \ldots, X_{iN_{max}}(t))$ be the vector containing the knowledge of node $s_i$. From FIG. 4, $P_{s_i}$ is the realization of the random variable $X_i(t)$ at each time slot t.

Let $Z(t)=(Z_1(t), \ldots, Z_{N_{max}}(t))$ be a random variable where $Z_i(t)$, $1 \le i \le N_{max}$ is a Bernoulli random variable denoting if the central unit knows that node $s_i$ is alive when the data collection is performed at time slot t. Let $Z(t)=\Sigma_{i=1}^{N_{max}} Z_i(t)$.

From the data collection algorithm, $\tilde{Z}$ is the realization of $Z(t)$ at query time t. Given the data collection equation, the random variable $Z_i(t)$, $1 \le i \le N_{max}$ can be written as follows:

$$Z_i(t) = \max_{s_j \in \mathcal{K}} X_{ji}(t). \quad (1)$$

Define $\mathcal{A}$ as the set of nodes that are alive and $\mathcal{D} = \mathcal{N} \setminus \mathcal{A}$ the set of nodes that are dead where $\mathcal{N}$ is the set of all nodes in the network. It can be seen that $|\mathcal{N}|=N_{max}$ and $|\mathcal{A}|=n$. This section assumes that nodes can have the same initial transmit probability f and the same erasure probability q. The following lemma links the estimator $\tilde{Z}(t)$ to the BLUE of the network size $\tilde{n}$ for t=0,1 and t=∞

Lemma 1. The estimator $\tilde{Z}(t)$ for t=0, t=1 and t=∞ is proportional to the BLUE of the network size it. In other words, it can be written as follows:

$$\tilde{Z}(0) = N_{max} \alpha_0 \tilde{n} \quad (2)$$

$$\tilde{Z}(1) = N_{max} \alpha_0 \alpha_1 \tilde{n} \quad (3)$$

$$\lim_{t \to \infty} \tilde{Z}(t) = \tilde{n}, \quad (4)$$

where $\alpha_0 = \dfrac{K}{N_{max}^2}$ and $\alpha_1 = \left(1 + \dfrac{N_{max} - K}{LW} \pi R^2 f(1-q)\right)$.

Note that while the results consider the cases for t=0,1 and ∞, they can be extended for any arbitrary execution time.

From the expressions proposed in Lemma 1, it is clear that when the number of queried nodes $K=N_{max}$, then the estimator $\tilde{Z}(t)$ is equal to the BLUE of the network size. Therefore, linking the counting estimator to the BLUE can be conjectured to be valid of all time instant t:

Conjecture 1. The estimator $\tilde{Z}(t)$ is the proportional to the BLUE $\tilde{n}$ of the network size and can be written as:

$$\tilde{Z}(t) = N_{max} \prod_{k=0}^{t} \alpha_k \tilde{n}, \quad (5)$$

$$\text{with } \prod_{k=0}^{\infty} \alpha_k = 1/N_{max} \text{ and } \lim_{K \to N_{max}} \prod_{k=0}^{t} \alpha_k = 1/N_{max}. \quad (6)$$

Simulation Results

This section presents the simulation results of the proposed counting algorithm. In all the simulations, the bound was set to $N_{max}=390$ for a network containing n=300 nodes. The field was set to the unit square, the connectivity radius to R=0.1 and the average packet erasure to Q=0.1. Due to space limitations, the performance of the network size estimator is not presented.

Figure 6:
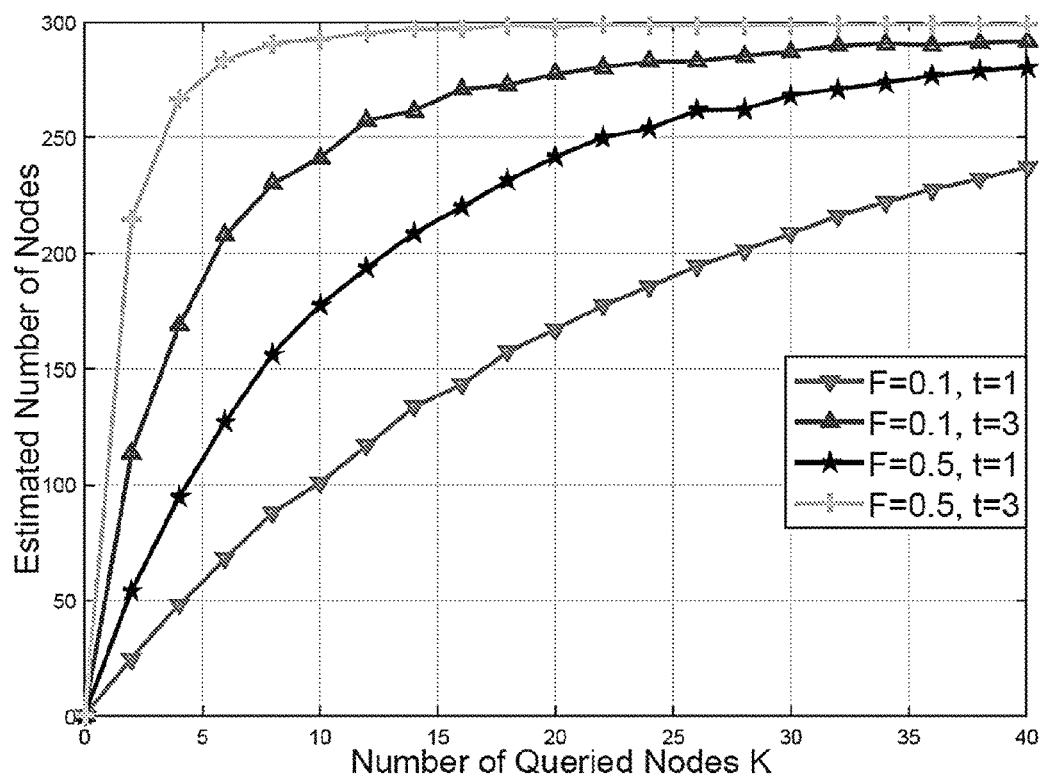
FIG. 6 is a graph illustrating an example of a number of queried nodes versus the number of estimated nodes for different combination of query time t and initial transmit probability F, according to various embodiments of the present disclosure.

FIG. 6 is an example illustrating the relation between the number of queried nodes and the number of estimated nodes in the network for different combinations of query time t and initial transmit probability F. Various embodiments of the present disclosure have found that asking 10% or more of nodes can give a good estimation of the network size. Besides, increasing the initial transmit probability F or the query time t can result in an enhancement of the performances.

Figure 7:
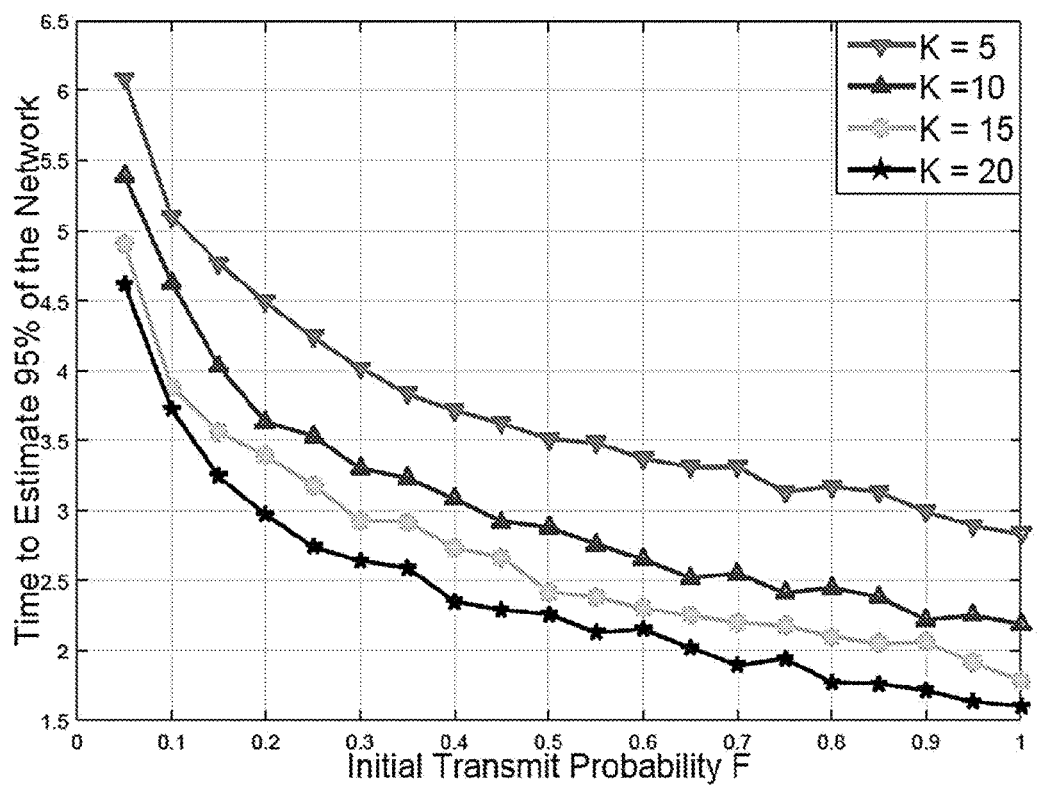
FIG. 7 is a graph illustrating an example of an initial transmit probability F versus the average time to perform 95% estimation of the network for different number of queried nodes K, according to various embodiments of the present disclosure.

FIG. 7 is an example graph that shows the initial transmit probability F versus the time t, in which the total estimation of network nodes is 95% or more for various queried nodes K. One can notice that for fixed F=0.5, increasing the queried nodes from K=10 to K=20, reduces the average time t to disseminate the node's information in the network.

Figure 8:
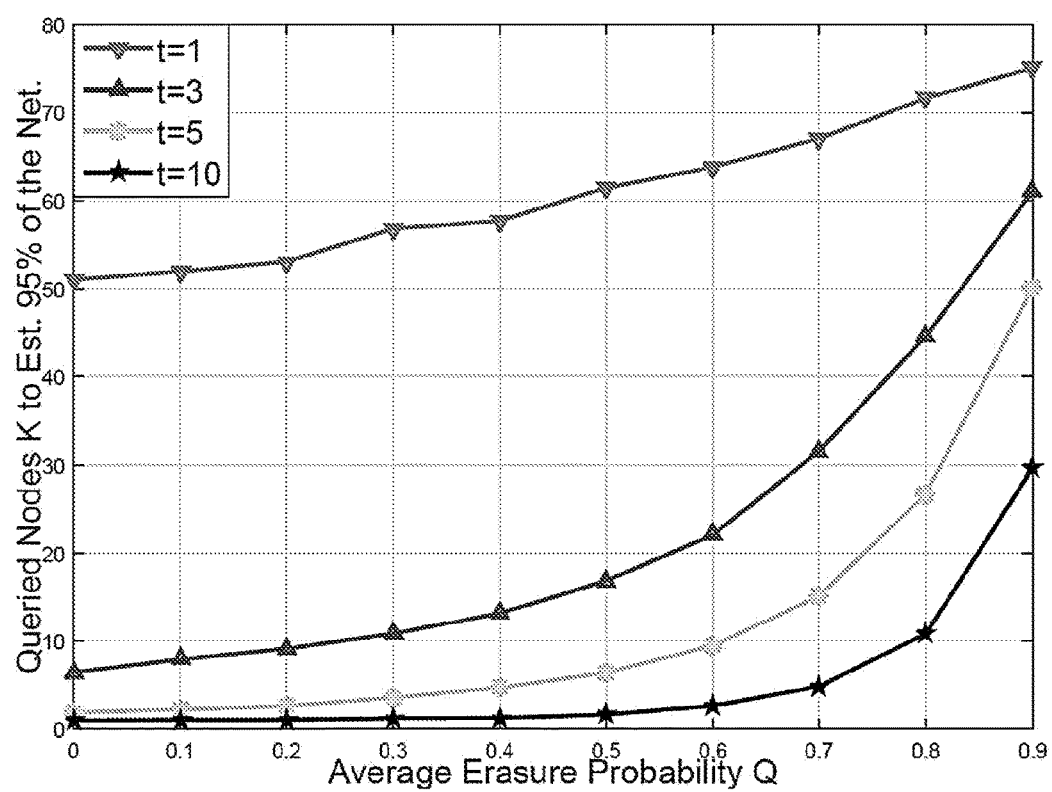
FIG. 8 is a graph illustrating an example of a number of queried nodes K versus the average erasure probability to perform 95% estimation of the network for different running times t, according to various embodiments of the present disclosure.

FIG. 8 is an example graph that illustrates the number of queried nodes K versus the average erasure probability, in which the total estimation of network nodes is 95% or more for different running times t. As expected, the number of queried nodes to perform 95% estimation of the whole network size can decrease with the number of iterations of the algorithm. This can be explained by the fact that as the number of iterations increases, each node can have more knowledge about the network configuration that results in a less queried nodes.

Examining the relationship between the queried time t versus the mean number of queried nodes K to achieve 95% or more of the total estimation of network size, it was noted that for t=8 the counting estimator reached the BLUE. Thus, for the setting, t=8 was sufficient for the condition t→∞. Increasing the initial transmit probability results in an improvement in the estimation of network size.

Figure 9:
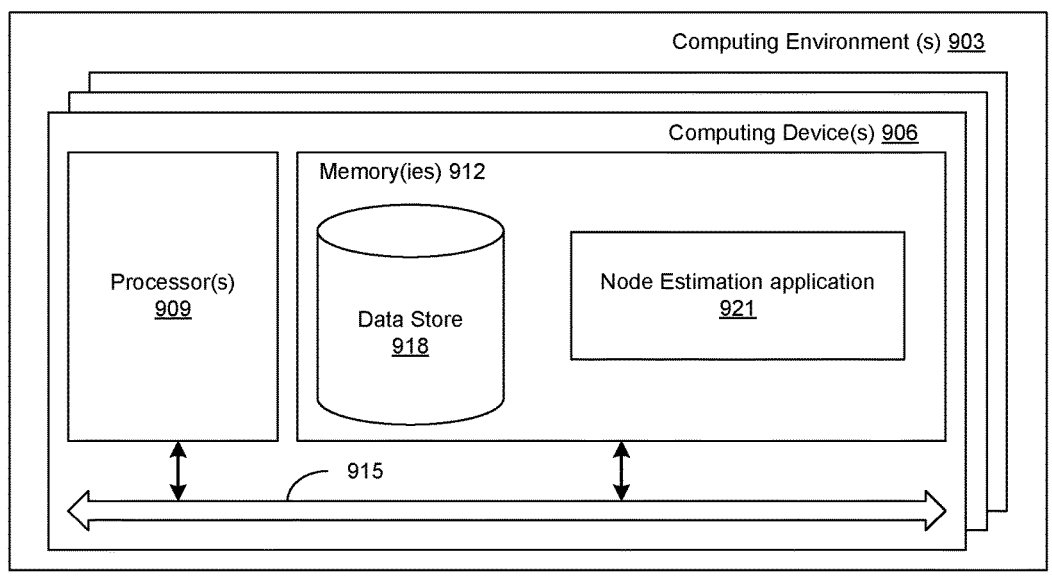
FIG. 9 is a schematic block diagram that provides on example illustration of a computing environment, according to an embodiment of the present disclosure.

With reference to FIG. 9, shown is a schematic block diagram of the computing environment 903 according to an embodiment of the present disclosure. The computing environment 903 includes one or more computing devices 906. Each computing device 906 includes at least one processor circuit, for example, having a processor 909 and a memory 912, both of which are coupled to a local interface 915. To this end, each computing device 906 may comprise, for example, at least one server computer or like device. The local interface 915 may comprise, for example, a data bus with an accompanying address/control bus or other bus structure as can be appreciated.

Stored in the memory 912 are both data and several components that are executable by the processor 909. In particular, stored in the memory 912 and executable by the processor 909 is a Node Estimation application 921, and potentially other applications. Also stored in the memory 912 may be a data store 918 and other data. In addition, an operating system may be stored in the memory 912 and executable by the processor 909.

It is understood that there may be other applications that are stored in the memory 912 and are executable by the processor 909 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 912 and are executable by the processor 909. In this respect, the term "executable" means a program file that is in a form that can ultimately be run by the processor 909. Examples of executable programs may be, for example, a compiled program that can be translated into machine code in a format that can be loaded into a random access portion of the memory 912 and run by the processor 909, source code that may be expressed in proper format such as object code that is capable of being loaded into a random access portion of the memory 912 and executed by the processor 909, or source code that may be interpreted by another executable program to generate instructions in a random access portion of the memory 912 to be executed by the processor 909, etc. An executable program may be stored in any portion or component of the memory 912 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 912 is defined herein as including both volatile and nonvolatile memory and data storage components. Volatile components are those that do not retain data values upon loss of power. Nonvolatile components are those that retain data upon a loss of power. Thus, the memory 912 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 909 may represent multiple processors 909 and/or multiple processor cores and the memory 912 may represent multiple memories 912 that operate in parallel processing circuits, respectively. In such a case, the local interface 915 may be an appropriate network that facilitates communication between any two of the multiple processors 909, between any processor 909 and any of the memories 912, or between any two of the memories 912, etc. The local interface 915 may comprise additional systems designed to coordinate this communication, including, for example, performing load balancing. The processor 909 may be of electrical or of some other available construction.

Although the Node Estimation application 921 and/or other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The algorithms of FIGS. 2, 4 and 5 show functionality and operation of an implementation of portions of the Node Estimation application 921. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 909 in a computer system or other system. The machine code may be converted from the source code, etc. If embodied in hardware, each block may represent a circuit or a number of interconnected circuits to implement the specified logical function(s).

Although the algorithms of FIGS. 2, 4 and 5 show a specific order of execution, it is understood that the order of execution may differ from that which is depicted. For example, the order of execution of two or more blocks may be scrambled relative to the order shown. Also, two or more steps shown in succession in FIGS. 2, 4 and 5 may be executed concurrently or with partial concurrence. Further, in some embodiments, one or more of the steps shown in FIGS. 2, 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, that comprises software or code can be embodied in any non-transitory computer-readable medium for use by or in connection with an instruction execution system such as, for example, a processor 909 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 906, or in multiple computing devices in the same computing environment 903. Additionally, it is understood that terms such as "application," "service," "system," "engine," "module," and so on may be interchangeable and are not intended to be limiting.

The present disclosure relates to a novel hybrid size estimation algorithm in an anonymous graph, in which each node knows only its unique identifier. In addition, the present disclosure discusses a node counting algorithm whose output can be used to perform network size estimation using statistical inference methods. For dense graphs and accurate running times, various embodiments of the present disclosure can show that the proposed algorithm produces an estimate of the total number of nodes proportional to the BLUE and that it converges when all the network nodes are queried. Simulation results show that various embodiments of the present disclosure can produce a good estimate when either the running time or the number of queried nodes are reasonable.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising
    receiving, over a wireless channel, a first transmission packet that includes a first identifier from a first one of a plurality of nodes;
    adding the first identifier to a second transmission packet based at least in part on a first comparison between the first identifier and a plurality of existing identifiers associated with the second transmission packet;
    adjusting a transmit probability based on the first comparison; and
    transmitting, over the wireless channel, the second transmission packet to at least one of the plurality of nodes based at least in part on a second comparison between the transmit probability and a probability distribution.

2. The method of claim 1, further comprising determining the probability distribution associated with the plurality of nodes with respect to the first one of the plurality of nodes.

3. The method of claim 1, wherein at least one of the plurality of nodes comprises a sensor device.

4. The method of claim 3, wherein the sensor device is configured to measure at least one of: a temperature, a pressure, a voltage, or a current.

5. A system, comprising
    a first network device in a network;
    an application executable in the first network device, wherein when executed, the application causes the first network device to at least:
        generate a first transmission packet that includes a first identifier and a list comprising a plurality of existing identifiers;
        receive a second transmission packet that includes a second identifier from a second network device in the network;
        add the second identifier to the list in response to a first comparison between the second identifier and the plurality of existing identifiers;
        adjust a transmit probability based on the first comparison; and
        transmit the first transmission packet to a third network device in the network based at least in part on a second comparison between the transmit probability and a probability distribution.

6. The system of claim 5, wherein the first comparison determines whether the second identifier matches one of the plurality of existing identifiers.

7. The system of claim 5, wherein the transmit probability is increased when the second identifier does not match one of the plurality of existing identifiers.

8. The system of claim 5, wherein the first network device transmits the first transmission packet to a data collector in response to a query message from the data collector.

9. The system of claim 5, wherein the transmit probability indicates a probability that the first network device will transmit the first transmission packet.

10. The system of claim 5, wherein the first network device determines the probability distribution by calculating a uniform distribution.

11. The system of claim 5, wherein the first network device transmits the first transmission packet to the third network device when the transmit probability exceeds the probability distribution.

12. The system of claim 5, wherein the first network device resets the transmit probability to an initial probability in response to transmission of the first transmission packet to the third network device.

13. The system of claim 5, wherein the first network device comprises a wireless transceiver, and the first transmission packet is transmitted over a wireless channel using the wireless transceiver.

14. The system of claim 5, wherein the list comprising the plurality of existing identifiers represents a plurality of neighboring wireless network devices located within a predefined radius with respect to a location of the first network device.

15. A method, comprising:
    transmitting, using a computing device, a query message to a plurality of sensor devices, the query message being transmitted over a wireless channel;
    receiving a transmission packet from at least one of the plurality of sensor devices, the transmission packet comprising data indicating a plurality of identifiers; and
    determining, using the computing device, a quantity of the plurality of sensor devices based at least in part on the plurality of identifiers,
    wherein the transmitting, receiving, and determining are performed as part of a query phase, the method further comprising
        performing an initialization phase; and
        performing a knowledge distribution phase,
        wherein the initialization and knowledge phases are performed prior to the query phase,
    wherein the initialization phase comprises:
        receiving, over the wireless channel, a first transmission packet that includes a first identifier from a first one of a plurality of nodes; and
        setting an initial transmit probability.

16. The method of claim 15, wherein the received first transmission packet further comprises coordinates of a node associated with the first identifier.

17. The method of claim 15, wherein the knowledge distribution phase comprises:
  adding the first identifier to a second transmission packet based at least in part on a first comparison between the first identifier and a plurality of existing identifiers associated with the second transmission packet;
  adjusting the initial transmit probability to form an adjusted transmit probability based on the first comparison; and
  transmitting, over the wireless channel, the second transmission packet to at least one of the plurality of nodes based at least in part on a second comparison between the transmit probability and a probability distribution.

18. The method of claim 17, wherein the knowledge distribution phase further comprises:
  resetting the adjusted transmit probability to the initial transmit probability after transmitting the second transmission packet.

* * * * *